United States Patent
Sullivan et al.

(10) Patent No.: US 10,427,005 B2
(45) Date of Patent: Oct. 1, 2019

(54) GOLF BALLS INCORPORATING POLYCYCLOPENTENE RUBBER

(71) Applicant: Acushnet Company, Fairhaven, MA (US)

(72) Inventors: Michael J. Sullivan, Old Lyme, CT (US); Brian Comeau, Berkley, MA (US); Douglas S. Goguen, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/849,750

(22) Filed: Dec. 21, 2017

(65) Prior Publication Data

US 2019/0192918 A1 Jun. 27, 2019

(51) Int. Cl.
- *A63B 37/06* (2006.01)
- *A63B 37/00* (2006.01)
- *C08L 23/26* (2006.01)

(52) U.S. Cl.
CPC ...... *A63B 37/0039* (2013.01); *A63B 37/0043* (2013.01); *A63B 37/0062* (2013.01); *A63B 37/0064* (2013.01); *A63B 37/0075* (2013.01); *C08L 23/26* (2013.01)

(58) Field of Classification Search
CPC .................................. A63B 37/0039
USPC ........................................... 473/370
See application file for complete search history.

(56) References Cited

U.S. PATENT DOCUMENTS

| | | | |
|---|---|---|---|
| 3,458,489 A | 7/1969 | Natta et al. | |
| 3,790,545 A | 2/1974 | Minchak | |
| 3,857,825 A | 12/1974 | Streck et al. | |
| 4,068,849 A | 1/1978 | DiSalvo et al. | |
| 8,889,806 B2 | 11/2014 | Tsunogae et al. | |
| 2010/0304895 A1* | 12/2010 | Comeau | A63B 37/0003 473/376 |
| 2016/0002382 A1 | 1/2016 | Tsunogae et al. | |
| 2017/0129990 A1 | 5/2017 | Tsunogae et al. | |
| 2017/0253695 A1 | 9/2017 | Tsunogae et al. | |

OTHER PUBLICATIONS yet2.com—TechPak; New rubber with high impact resilience, excellent cold-resistance, and exceptional vibration absorption; Apr. 19, 2017; pp. 1-10.

Zeon Corporation; Exerpted from 25th Polymer Material Forum Nagoya, Japan(2016); Novel Elastomer Development of Polycyclopentene(CPR); Nov. 11, 2016; pp. 1-13.

* cited by examiner

*Primary Examiner* — Raeann Gorden
(74) *Attorney, Agent, or Firm* — Margaret C. Barker

(57) ABSTRACT

Golf ball constructions incorporating at least one layer comprising a polycyclopentene rubber having advantageously modified end groups.

17 Claims, No Drawings

GOLF BALLS INCORPORATING POLYCYCLOPENTENE RUBBER

FIELD OF THE INVENTION

Durable golf balls incorporating non-polybutadiene elastomers having good resilience, low compression set, sufficient ultimate elongation and low temperature properties.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Examples of golf ball materials range from rubber materials, such as balata, styrene butadiene, polybutadiene, or polyisoprene, to thermoplastic or thermoset resins such as ionomers, polyolefins, polyamides, polyesters, polyurethanes, polyureas and/or polyurethane/polyurea hybrids, and blends thereof. Typically, outer layers are formed about the spherical outer surface of an innermost golf ball layer via compression molding, casting, or injection molding.

From the perspective of a golf ball manufacturer, it is desirable to have materials exhibiting a wide range of properties, such as resilience, durability, spin, and "feel," because this enables the manufacturer to make and sell golf balls suited to differing levels of ability and/or preferences. In this regard, playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from these different types of constructions can be quite significant.

Meanwhile, a golf ball's durability remains an important consideration. In this vein, the impact resistance of golf ball materials is an important property. Two important golf ball characteristics relating to impact resistance include elongation and compression set. Elongation is a measure of a material's elasticity and ability to withstand repeated blows on the course without fracturing. Compression set, meanwhile, is a measure of the material's ability to return to its original thickness after prolonged compressive stresses at a given temperature and deflection. Compression set results are typically expressed as a percentage, wherein a lower percentage indicates a better ability to resist permanent deformation.

On the one hand, golf ball materials having insufficient elongation are generally too brittle or stiff to remain in-tact when the golf ball is subjected to repeated blows by a club face at typically high swing speeds. On the other hand, permanent deformation of a golf ball layer material can create spaces or other separation between that layer and an adjacent layer which reduces golf ball durability.

Developing materials having balanced elongation and compression set can be difficult without meanwhile negatively impacting other desirable golf ball properties and increasing manufacturing costs. Accordingly, there is a continued need for cost effective golf ball constructions durably incorporating materials having both of these abilities to withstand the great force and impact of the golf club face striking the golf ball yet excellent "memory" or capacity to repeatedly return to its original shape following that great force and impact. Golf balls of the invention and methods of making same address and solve these needs.

SUMMARY OF THE INVENTION

Advantageously, a golf ball of the invention incorporates at least one layer comprised of a polycyclopentene rubber and possessing excellent compression set in order to resist permanent deformation when a club head strikes the golf ball, yet having sufficient ultimate elongation to withstand repeated blows on the course without meanwhile negatively impacting or otherwise reducing other targeted desirable golf ball characteristics. In one embodiment, a golf ball of the invention has an intermediate layer comprising a polycyclopentene rubber composition and disposed between a core layer that does not contain polycyclopentene rubber and at least one cover layer comprising a thermoplastic or thermoset material.

In this embodiment, the core layer has a surface hardness of less than 82 Shore C and greater than a Shore C geometric center hardness of the core layer by from 15 to 30 Shore C hardness points to define a positive hardness gradient. Meanwhile, the intermediate layer has a surface hardness of at least 83 Shore C.

In a particular such embodiment, polycyclopentene rubber is crosslinked with at least one of a peroxide compound and a sulfur compound. The peroxide and/or sulfur compound is present in an amount of from about 1 part to about 5 parts based on 100 parts of polycyclopentene.

In a specific embodiment, at least one polycyclopentene rubber is blended with polybutadiene in a wt. ratio of from about 25:75 to about 75:25. In one such embodiment, greater than 50 wt. % of the at least one polycyclopentene rubber is trans-polycyclopentene rubber. In another such embodiment, greater than 50 wt. % of the at least one polycyclopentene rubber is cis-polycyclopentene rubber.

In one embodiment, the cover layer consists of a thermoset polyurethane. In another embodiment, the cover layer consists of a thermoplastic polyurethane.

The cyclopentene rubber may comprise cyclopentene rubber molecules that are each mono-substituted, or are each di-substituted. In other embodiments, at least some cyclopentene rubber molecules may be mono-substituted, while other cyclopentene rubber molecules are di-substituted.

And a given cyclopentene rubber molecule may have an alpha terminal end that is the same as or alternatively different than an omega terminal end of the cyclopentene rubber molecule.

At least one of an alpha terminal end and an omega terminal end of a cyclopentene rubber molecule may have a functional group selected from the group consisting of hydroxyls, amines, vinyl unsaturation, carboxylic acids and derivatives thereof, acrylics, methacrylics, silanes, siloxanes, thiols, sulfonic acids, epoxies, esters, amides, urethanes, ureas, halogens, hydrocarbons, and combinations thereof.

And a given cyclopentene rubber molecule can become mono-substituted or di-substituted at terminal ends using a chain transfer agent such as olefinically unsaturated hydrocarbons having a selected functional group at the terminal ends of the olefin portion of the olefinically unsaturated hydrocarbon.

In an alternative embodiment, a golf ball of the invention has a center, comprised of a blend of polycyclopentene rubber and polybutadiene in a wt. ratio of from about 1:99 to about 40:60, and a cover layer. In a specific embodiment, the blend comprises polycyclopentene rubber and polybutadiene in a wt. ratio of from about 5:95 to about 20:80.

In a different embodiment, a golf ball of the invention comprises: a core having a diameter of 1.55 inches or less and comprised of polybutadiene; an intermediate layer having an outer diameter of no greater than 1.62 inches and comprising a mixture of: (i) 100 parts cis-polycyclopentene rubber, (ii) about 1 to 5 parts dicumyl peroxide per 100 parts of cis-polycyclopentene rubber, and (iii) about 25 parts of at least one of zinc diacrylate, zinc dimethacrylate, trimethylolpropane triacrylate and trimethylolpropane trimethacrylate per 100 parts of cis-polycyclopentene rubber; and a cover layer disposed about the intermediate layer comprising a thermoset or thermoplastic composition.

In this embodiment, the intermediate layer has a Shore C hardness of 80 or less. In a specific such embodiment, the intermediate layer has a Shore C hardness of 70 or less. In yet another such embodiment, the intermediate layer has a Shore C hardness of from 20 to 75.

In one such embodiment, the cover layer comprises an ionomer blend. Alternatively, the cover layer may comprise a thermoset polyurethane. In a different such embodiment, the cover layer comprises a thermoplastic polyurethane.

In yet another construction, a golf ball of the invention has at least one layer comprising a blend of at least one ionomer and polycyclopentene rubber, wherein the blend has a Shore D hardness that is less than a Shore D hardness of the at least one ionomer. In this embodiment, the polycyclopentene rubber is present in the blend in an amount of from about 1 to 50 parts per 100 parts of ionomer. In a specific such embodiment, the polycyclopentene rubber is present in the blend in an amount of from about 5 to 25 parts per 100 parts of ionomer.

In any of these embodiments, the polycyclopentene rubber may be grafted or co-polymerized with a polar group-containing compound. In a particular embodiment, the polar group-containing compound is selected from the group consisting of maleic anhydride and maleic acid. When grafted or co-polymerized, the polycyclopentene rubber is present in the blend in an amount of from about 5 to 25 parts per 100 parts of ionomer.

In a further such specific embodiment, the at least one layer is an outer cover layer that is disposed about and adjacent to an inner cover layer that comprises the same ionomer used in the blend of the outer cover layer and does not comprise a polycyclopentene rubber and has a Shore D hardness that is greater than a Shore D hardness of the outer cover layer.

DETAILED DESCRIPTION

Advantageously, a golf ball of the invention incorporates at least one layer comprised of a polycyclopentene rubber and possessing excellent compression set to resist permanent deformation when a club head strikes the golf ball, yet having sufficient ultimate elongation to withstand repeated blows on the course without meanwhile negatively impacting or otherwise reducing other targeted desirable golf ball characteristics. In one embodiment, a golf ball of the invention comprises an intermediate layer comprised of a polycyclopentene rubber composition and disposed between a core layer that does not contain polycyclopentene rubber and at least one cover layer comprising a thermoplastic or thermoset material.

In this embodiment, the core layer has a surface hardness of less than 82 Shore C and greater than a Shore C geometric center hardness of the core layer by from 15 to 30 Shore C hardness points to define a positive hardness gradient. Meanwhile, the intermediate layer has a surface hardness of at least 85 Shore C.

In one such embodiment, the core layer has a surface hardness of from about 50 to less than 82 and a Shore C geometric center hardness of from about 35 to about 67, and the intermediate layer has a surface hardness of at least 83 Shore C.

In another such embodiment, the core layer has a surface hardness of from about 60 to 80 and a Shore C geometric center hardness of at least 45, and the intermediate layer has a surface hardness of at least 85 Shore C.

In yet another embodiment, the core layer has a surface hardness of from about 55 to about 65 and a Shore C geometric center hardness of from about 40 to about 80, and the intermediate layer has a surface hardness of at least 90 Shore C.

In still another embodiment, the core layer has a surface hardness of from about 50 to about 82 and a Shore C geometric center hardness of from about 35 to about 55, and the intermediate layer has a surface hardness of at least 85 Shore C.

In an alternative embodiment, the core layer has a surface hardness Shore C hardness of from about 60 to less than 82 and a Shore C geometric center hardness of from about 45 to less than 67, and the intermediate layer has a surface hardness of at least 90 Shore C.

In a different embodiment, the core layer has a surface hardness of less than 82 Shore C and a Shore C geometric center hardness of less than 67, and the intermediate layer has a surface hardness of greater than 83 Shore C.

In particular embodiments, the polycyclopentene rubber is crosslinked with at least one of a peroxide compound and a sulfur compound. The peroxide and/or sulfur compound is present in an amount of from about 1 part to about 5 parts based on 100 parts of polycyclopentene. Embodiments are envisioned, however, wherein peroxide and/or sulfur compound is present in an amount of from at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber.

In a specific embodiment, at least one polycyclopentene rubber is blended with polybutadiene in a wt. ratio of from about 25:75 to about 75:25. Alternative embodiments are envisioned wherein the at least one polycyclopentene rubber is blended with polybutadiene in wt. ratios of from about 30:70 to about 70:30, or from about 35:65 to about 65:35, or from about 40:60 to about 60:40, or about 45:55 to about 55:45, or in an amount of about 50:50.

In one embodiment, greater than 50 wt. % of the at least one polycyclopentene rubber is trans-polycyclopentene rubber. In another such embodiment, greater than 50 wt. % of the at least one polycyclopentene rubber is cis-polycyclopentene rubber.

In a one embodiment, the cover layer consists of a thermoset polyurethane. In another embodiment, the cover layer consists of a thermoplastic polyurethane.

The cyclopentene rubber may comprise cyclopentene rubber molecules that are each mono-substituted, or are each di-substituted. In other embodiments, at least some cyclopentene rubber molecules may be mono-substituted, while other cyclopentene rubber molecules are di-substituted.

And a given cyclopentene rubber molecule may have an alpha terminal end that is the same as or alternatively different than an omega terminal end of the cyclopentene rubber molecule.

At least one of an alpha terminal end and an omega terminal end of a cyclopentene rubber molecule may have a functional group selected from the group consisting of hydroxyls, amines, vinyl unsaturation, carboxylic acids and derivatives thereof, acrylics, methacrylics, silanes, siloxanes, thiols, sulfonic acids, epoxies, esters, amides, urethanes, ureas, halogens, hydrocarbons, and combinations thereof.

And a given cyclopentene rubber molecule can become mono-substituted or di-substituted at terminal ends using a chain transfer agent such as olefinically unsaturated hydrocarbons having a selected functional group at the terminal ends of the olefin portion of the olefinically unsaturated hydrocarbon.

In an alternative embodiment, a golf ball of the invention has a center, comprised of a blend of polycyclopentene rubber and polybutadiene in a wt. ratio of from about 1:99 to about 40:60, and a cover layer. In a specific embodiment, the blend comprises polycyclopentene rubber and polybutadiene in a wt. ratio of from about 5:95 to about 20:80. In other such embodiments, the blend comprises polycyclopentene rubber and polybutadiene in a wt. ratio of from about 10:90 to about 30:70, or from about 20:80 to about 40:60, or from about 30:70 to about 40:60.

In a different embodiment, a golf ball of the invention comprises: a core having a diameter of 1.55 inches or less and comprised of polybutadiene; an intermediate layer having an outer diameter of no greater than 1.62 inches and comprising a mixture of: (i) 100 parts cis-polycyclopentene rubber, (ii) about 1 to 5 parts dicumyl peroxide per 100 parts of cis-polycyclopentene rubber, and (iii) about 25 parts of at least one of zinc diacrylate, zinc dimethacrylate, trimethylolpropane triacrylate and trimethylolpropane trimethacrylate per 100 parts of cis-polycyclopentene rubber; and a cover layer disposed about the intermediate layer comprising a thermoset or thermoplastic composition.

In this embodiment, the intermediate layer has a Shore C hardness of 80 or less. In a specific such embodiment, the intermediate layer has a Shore C hardness of 70 or less. In yet another such embodiment, the intermediate layer has a Shore C hardness of from 20 to 75.

In one such embodiment, the cover layer comprises an ionomer blend. Alternatively, the cover layer may comprise a thermoset polyurethane. In a different such embodiment, the cover layer comprises a thermoplastic polyurethane.

In yet another construction, a golf ball of the invention has at least one layer comprising a blend of at least one ionomer and polycyclopentene rubber, wherein the blend has a Shore D hardness that is less than a Shore D hardness of the at least one ionomer. In this embodiment, the polycyclopentene rubber is present in the blend in an amount of from about 1 to 50 parts per 100 parts of ionomer. In a specific such embodiment, the polycyclopentene rubber is present in the blend in an amount of from about 5 to 25 parts per 100 parts of ionomer.

In any of these embodiments, the polycyclopentene rubber may be grafted or co-polymerized with a polar group-containing compound. In a particular embodiment, the polar group-containing compound is selected from the group consisting of maleic anhydride and maleic acid. When grafted or co-polymerized, the polycyclopentene rubber is present in the blend in an amount of from about 5 to 25 parts per 100 parts of ionomer.

In specific such embodiments, the polycyclopentene rubber is present in the blend in an amount of from about 5 to 45 parts per 100 parts of ionomer, or in an amount of from about 15 to 35 parts per 100 parts of ionomer, or in an amount of from about 20 to 30 parts per 100 parts of ionomer, or in an amount of from about 10 to 50 parts per 100 parts of ionomer, or in an amount of from 20 to 45 parts per 100 parts of ionomer, or in an amount of up to about 10 parts per 100 parts of ionomer, or in an amount of up to about 20 parts per 100 parts of ionomer, or in an amount of up to about 30 parts per 100 parts of ionomer, or up to about 40 parts per 100 parts of ionomer, or up to 50 parts per 100 parts of ionomer.

In a further such specific embodiment, the at least one layer is an outer cover layer that is disposed about and adjacent to an inner cover layer that comprises the same ionomer used in the blend of the outer cover layer and does not comprise a polycyclopentene rubber and has a Shore D hardness that is greater than a Shore D hardness of the outer cover layer.

In one embodiment, the Shore D hardness of the inner cover layer is greater than the Shore D of the outer cover layer by up to about 20 Shore D hardness points, or by up to about 10 Shore D hardness points, or by up to about 5 Shore D hardness points.

In contrast with conventional rubber such as polybutadiene, polyisoprene, and/or natural rubber, which have molecular branches, polycyclopentene rubber is a linear, unbranched chain polymer that is formed by opening the ring of cyclopentene via metathesis polymerization. This non-branched structure permits the molecule to be modified much more easily than conventional rubber and terminally on both ends.

The cyclopentene rubber may be mono or di-substituted at the terminal ends. The alpha and omega terminal end maybe the same or different. Suitable functional groups include hydroxyl, amine, vinyl unsaturation, carboxylic acid and derivatives, acrylic, methacrylic, silane, siloxane, thiol, sulfonic acid, epoxy, ester, amide, urethane, urea, halogen, or hydrocarbon.

Examples of suitable chain transfer agents include olefinically unsaturated hydrocarbons with the desired functional groups at the terminal ends of the olefin.

Thus, a golf ball of the invention incorporates a layer of polycyclopentene rubber advantageously possessing excellent compression set and ultimate elongation. Compression set, as referred to herein may be tested using ASTM D395, Test Method B to measure the permanent deformation remaining when a force (that was applied to it) is removed. This permanent deformation is of particular concern when elastomers are used to create golf ball layers, including intermediate layers and cover layers because deformation can impact golf ball durability, for example how adjacent layers adhere and conform. Such deformation has the potential to create spaces between layers over time after repeated hits on the course, and delamination or other separation of layers can result.

Compression set results for a material are expressed as a percentage. The lower the percentage, the better the material resists permanent deformation under a given deflection and temperature range. Compression set results can be confusing in that they are calculated different ways under different methods of testing. Using ASTM D395, solid specimens of 0.25" thick×0.52" diameter are compressed to 0.177" thick using a device as diagrammed, for 22 to 70 hour periods at elevated temperature in an air circulating oven. Compression set represents the percent of deflection that did not return. That means that if a sample disc, tested for 70 hours at 212° F., and then allowed to cool for 30 minutes, measured 0.221" thick, the Compression Set would be 40% since the disc was deflected 0.073", yet returned 0.044" (back up to 0.221") indicating that the amount of the distance compressed that it did not return is 40%.

Compression Set (ASTM D395 Method $B$)={(orig. thickness−final thickness)/(orig. thickness−space bar thickness)}*100 so that 40%={(0.25"−0.221")/(0.25"−0.177")}*100.

In golf balls of the invention, the material in the golf ball layer incorporating at least one polycyclopentene rubber has a desirable compression set of up to about 30%, or less than 30%, or between 25% and 35%, or of 25% or less, or of less than 25%, or of about 20% or less.

Meanwhile, the material in the golf ball layer incorporating at least one polycyclopentene rubber has a desirable elongation at break of at least 10%, or of at least 20%, or of at least 30%, or of at least 40%, or of 50% or greater, or of greater than 50%, or of up to 50%, or of up to 100%, or of up to 150%, or of up to 200%, or of up to 250%.

The resulting material has excellent flexural modulus (ASTM D-790), tensile strength (ASTM D-638), and ultimate elongation (ASTM D-638) than conventional rubber golf ball materials such as polybutadiene.

The properties of compression set and elongation can be balanced, for example, by targeting the level of curative employed to crosslink the polycyclopentene rubber.

In many embodiments, adhesion is maximized between a golf ball layer comprising polycyclopentene rubber and an adjacent layer (inner and/or surrounding) where the adjacent layer does not contain polycyclopentene rubber.

Golf balls of the invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. Also, the USGA has established a maximum weight of 45.93 g (1.62 ounces) for golf balls. For play outside of USGA rules, the golf balls can be heavier. Thus, the diameter of the golf balls may be, for example, from about 1.680 inches to about 1.800 inches, or from about 1.680 inches to about 1.760 inches, or from about 1.680 inches (43 mm) to about 1.740 inches (44 mm), or even anywhere in the range of from 1.700 to about 1.950 inches.

Golf balls of the invention incorporating at least one layer comprised of polycyclopentene rubber may be formed using a variety of application techniques. For example, at least some of the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

The present invention is not limited by any particular process for forming the golf ball layer(s). It should be understood that the layer(s) can be formed by any suitable technique, including injection molding, compression molding, casting, and reaction injection molding.

When injection molding is used, the composition is typically in a pelletized or granulated form that can be easily fed into the throat of an injection molding machine wherein it is melted and conveyed via a screw in a heated barrel at temperatures of from 150° F. to 600° F., preferably from 200° F. to 500° F. The molten composition is ultimately injected into a closed mold cavity, which may be cooled, at ambient or at an elevated temperature, but typically the mold is cooled to a temperature of from 50° F. to 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

When compression molding is used to form a center, the composition is first formed into a preform or slug of material, typically in a cylindrical or roughly spherical shape at a weight slightly greater than the desired weight of the molded core. Prior to this step, the composition may be first extruded or otherwise melted and forced through a die after which it is cut into a cylindrical preform. It is that preform that is then placed into a compression mold cavity and compressed at a mold temperature of from 150° F. to 400° F., preferably from 250° F. to 350° F., and more preferably from 260° F. to 295° F. When compression molding a core or cover layer of an HNP composition, a half-shell is first formed via injection molding and then a core comprising one or more layers is enclosed within two half shells and then compression molded in a similar manner to the process previously described.

Reaction injection molding processes are further disclosed, for example, in U.S. Pat. Nos. 6,083,119, 7,338,391, 7,282,169, 7,281,997 and U.S. Patent Application Publication No. 2006/0247073, the entire disclosures of which are hereby incorporated herein by reference.

The diameter and thickness of the different layers, along with properties such as hardness and compression, may vary depending upon the desired playing performance properties of the golf ball such as spin, initial velocity, and feel. The term, "layer", as used herein, means generally any spherical portion of the golf ball, including the layer comprised of polycyclopentene rubber, which may be any layer of the golf ball as desired to target specific golf ball playing characteristics.

Accordingly, the dimensions of each golf ball component such as the diameter of the core and respective thicknesses of the intermediate layer (s), cover layer(s) and/or coating layer(s) may be selected and coordinated as known in the art for targeting and achieving such desired playing characteristics or feel. Ideally, a golf ball of the invention is at least a three-piece golf ball, including the layer comprised of polycyclopentene rubber as an intermediate layer such as an outer core layer, casing layer and/or inner cover layer. However, embodiments are indeed envisioned wherein the layer comprise of polycyclopentene rubber is an inner core or even an outermost layer, with the limitation being that the surface properties of the layer comprised of polycyclopentene rubber as an outermost layer should be such that the golf ball could withstand the great force of a club striking that surface without cracking or otherwise breaking.

Alternatively, a golf ball of the invention may have only two layers including the layer comprised of polycyclopentene rubber. In one such embodiment, a golf ball of the invention may comprise a single core and a single cover layer or coating layer, wherein the layer comprised of polycyclopentene rubber is either the core and/or disposed about the core as the cover or coating layer.

In a different version, a golf ball of the invention may incorporate a dual-layered core and a single-layered cover, wherein the layer comprised of polycyclopentene rubber is an outer core layer. The dual-core includes an inner core (center) and surrounding outer core layer of polycyclopentene rubber.

In another version, the golf ball may contain a single core layer and two cover layers, wherein the layer of polycyclopentene rubber is an inner cover layer. In yet another version, a golf ball may contain a dual-core and dual-cover (inner cover layer and outer cover layer), wherein the layer of polycyclopentene rubber is an outer core layer and/or an inner cover layer.

In still another embodiment, a golf ball of the invention may contain a dual-core; an inner cover layer, an intermediate cover layer, and an outer cover layer, wherein the layer of polycyclopentene rubber is an outer core layer and/or an inner cover layer and/or an intermediate cover layer. Or, a golf ball may contain a three-layered core with an innermost core layer (or center), an intermediate core layer, and outer core layer, and a two-layered cover with an inner and outer cover layer, wherein the layer of polycyclopentene rubber is any or all of the intermediate core layer, outer core layer and/or inner cover layer.

That being said, a core layer in a golf ball of the invention may for example be solid, semi-solid, fluid-filled, or hollow, and may have a single-piece or multi-piece structure. The overall diameter of the core and all intermediate layers is often about 80 percent to about 98 percent of the overall diameter of the finished ball. When not comprised of polycyclopentene rubber, a variety of materials may be used to make the core or core layers including thermoset compositions such as rubber, styrene butadiene, polybutadiene, isoprene, polyisoprene, trans-isoprene; thermoplastics such as ionomer resins, polyamides or polyesters; and thermoplastic and thermoset polyurethane and polyurea elastomers. In one embodiment, the core is a single-piece made from a natural or synthetic rubber composition such as polybutadiene. In other instances, a two-piece core is constructed; that is, there may be two core layers. For example, an inner core portion may be made of a first base rubber material and an outer core layer, which surrounds the inner core, may be made of a second base rubber material. The respective core pieces may be made of the same or different rubber materials. Cross-linking agents and fillers may be added to the rubber materials.

More particularly, materials for solid cores typically include compositions having a base rubber, a filler, an initiator agent, and a cross-linking agent. The base rubber typically includes natural or synthetic rubber, such as polybutadiene rubber. In one embodiment, the base rubber is 1,4-polybutadiene having a cis-structure of at least 40%. The polybutadiene can be blended with other elastomers such as natural rubber, polyisoprene rubber, styrene-butadiene rubber and/or other polybutadienes. Another suitable rubber that may be used in the core is trans-polybutadiene. This polybutadiene isomer is formed by converting the cis-isomer of the polybutadiene to the trans-isomer during a molding cycle. A soft and fast agent such as pentachlorothiophenol (PCTP) or ZnPCTP can be blended with the polybutadiene. These compounds may also function as cis-to-trans catalyst to convert some cis-1,4 bonds in the polybutadiene into trans 1,4 bonds.

Fillers, which may be used to modify such properties as the specific gravity (density-modifying materials), hardness, weight, modulus, resiliency, compression, and the like may be added to the core composition. Normally, the fillers are inorganic, and suitable fillers include numerous metals or metal oxides, such as zinc oxide and tin oxide, as well as barium sulfate, zinc sulfate, calcium carbonate, barium carbonate, clay, tungsten, tungsten carbide, silica, and mixtures thereof. Fillers may also include various foaming agents or blowing agents, zinc carbonate, regrind (recycled core material typically ground to about 30 mesh or less particle size), high-Mooney-viscosity rubber regrind, and the like. In addition, polymeric, ceramic, metal, and glass microspheres may be used.

Again, the hardness of the core may vary depending upon the desired properties of the ball.

In one embodiment, at least one of the core layers is formed of a rubber composition comprising polybutadiene rubber material. More particularly, in one version, the ball contains a single inner core formed of the polybutadiene rubber composition. In a second version, the ball contains a dual-core comprising an inner core (center) and surrounding outer core layer.

In one version, the core is formed of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and surrounding outer core layer in a dual-layer construction. In another version, the core may be formed from an ionomer composition comprising an ethylene acid copolymer containing acid groups such that greater than 70% of the acid groups are neutralized. These highly neutralized polymers (HNPs) also may be used to form at least one core layer in a multi-layered core construction. For example, a polybutadiene rubber composition may be used to form the center and a HNP composition may be used to form the outer core. Such rubber and HNP compositions are discussed in further detail below.

In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyl-lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butylperoxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a thermoplastic or thermoset composition, such as thermoset rubber. Meanwhile, the intermediate and outer core layers also may be formed from thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a thermoset composition; and the outer core layer is formed from a thermoplastic composition. In a third embodiment, the intermediate core layer is formed from a thermoplastic composition; and the outer core layer is formed from a thermoset composition. Finally, in a fourth embodiment, the intermediate core layer is formed from a first thermoplastic composition; and the outer core layer is formed from a second thermoplastic compositions.

The core may for example have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches. In one embodiment, the inner core consists of a single layer formed from a thermoset rubber composition. In another embodiment, the inner core consists of two layers, each of which is formed from the same or different thermoset rubber compositions. In another embodiment, the inner core comprises three or more layers, each of which is formed from the same or different thermoset rubber compositions. In another embodiment, the inner core consists of a single layer formed from a thermoplastic composition. In another embodiment, the inner core consists of two layers, each of which is formed from the same or different thermoplastic compositions. In another embodiment, the inner core comprises three or more layers, each of which is formed from the same or different thermoplastic compositions. In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 inches.

In one embodiment, the outer core consists of a single layer formed from a thermoset rubber composition. In another embodiment, the outer core consists of two layers, each of which is formed from the same or different thermoset rubber compositions. In another embodiment, the outer core comprises three or more layers, each of which is formed from the same or different thermoset rubber compositions. In another embodiment, the outer core consists of a single layer formed from a thermoplastic composition. In another embodiment, the outer core consists of two layers, each of which is formed from the same or different thermoplastic compositions. In another embodiment, the outer core comprises three or more layers, each of which is formed from the same or different thermoplastic compositions.

The cores and core layers of golf balls of the invention may have varying hardnesses depending on the particular golf ball construction and playing characteristics being targeted. Core center and/or layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C. In other embodiments, core center and/or layer hardness can range, for example, from about 20 Shore D to about 78 Shore D, or from about 30 Shore D to about 60 Shore D, or from about 40 Shore D to about 50 Shore D, or 50 Shore D or less, or greater than 50 Shore D.

An intermediate core layer can have an overall thickness within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches. In one embodiment, the intermediate core consists of a single layer formed from a thermoset rubber composition. In another embodiment, the intermediate core consists of two layers, each of which is formed from the same or different thermoset rubber compositions. In another embodiment, the intermediate core comprises three or more layers, each of which is formed from the same or different thermoset rubber compositions. In another embodiment, the intermediate core consists of a single layer formed from a thermoplastic composition. In another embodiment, the intermediate core consists of two layers, each of which is formed from the same or different thermoplastic compositions. In another embodiment, the intermediate core comprises three or more layers, each of which is formed from the same or different thermoplastic compositions.

The compression of the core is generally overall in the range of about 40 to about 110, although embodiments are envisioned wherein the compression of the core is as low as 5. In other embodiments, the overall CoR of cores of the present invention at 125 ft/s is at least 0.750, or at least 0.775 or at least 0.780, or at least 0.785, or at least 0.790, or at least 0.795, or at least 0.800. Cores are also known to comprise rubbers and also may be formed of a variety of other materials that are typically also used for intermediate and cover layers. Intermediate layers may likewise also comprise materials generally used in cores and covers as described herein for example.

An intermediate layer is sometimes thought of as including any layer(s) disposed between the inner core (or center) and the outer cover of a golf ball, and thus in some embodiments, the intermediate layer may include an outer core layer, a casing layer, or inner cover layer(s). In this regard, a golf ball of the invention may include one or more intermediate layers. An intermediate layer may be used, if desired, with a multilayer cover or a multilayer core, or with both a multilayer cover and a multilayer core.

In one non-limiting embodiment, an intermediate layer having a thickness of about 0.010 inches to about 0.06 inches, is disposed about a core having a diameter ranging from about 1.5 inches to about 1.59 inches. In this embodiment, the core may consist of a conventional core material such as a rubber composition. In some embodiments, the intermediate layer may be covered by a conventional castable thermoset or injection moldable thermoplastic material or of any other cover materials discussed herein or as is otherwise known in the art.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly(ether-amide), polyphenylene oxide resins or blends thereof, and thermoplastic polyesters.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

In one embodiment, the cover may be a single layer having a surface hardness of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from an ionomeric composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a thermoplastic composition selected from ionomer-, polyurethane-, and polyurea-based compositions having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a thermosetting polyurethane- or polyurea-based composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer formed from an ionomeric composition and an outer cover layer formed from a thermosetting polyurethane- or polyurea-based composition. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In another embodiment, the cover may comprise an inner cover layer formed from an ionomeric composition and an outer cover layer formed from a thermoplastic composition selected from ionomer-, polyurethane-, and polyurea-based compositions. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer formed from an ionomeric composition and an outer cover layer formed from a polyurethane- or polyurea-based composition. The ionomeric layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may be formed from a castable or reaction injection moldable polyurethane, polyurea, or copolymer or hybrid of polyurethane/polyurea. Such cover material may be thermosetting, but may be thermoplastic in other embodiments. The outer cover layer composition may have a material hardness of 85 Shore C or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

In one embodiment, a golf ball of the invention may be covered with a castable thermoset or injection moldable thermoplastic material or any of the other cover materials discussed below. In this embodiment, the core may for example have a diameter of about 0.5 inches to about 1.64 inches and the cover layer thickness may range from about 0.02 inches to about 0.12 inches.

In this regard, covers may have one or more layers as well. The cover material should impart durability, toughness and tear-resistance to the ball. For example, polyurethane/polyurea compositions can be used in the cover layer, because they can provide the cover with high durability as well as a soft feel. In other embodiments, the cover may be made of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof.

In one embodiment, ionomer resins can be used as the cover material. These cross-linked polymers contain interchain ionic bonding as well as covalent bonding. The ionomer resins include, for example, a copolymer of ethylene and an acid group such as methacrylic or acrylic acid. Metal ions such as sodium, lithium, zinc, and magnesium are used to neutralize the acid groups in the polymer. Commercially available ionomer resins are known in the industry and include numerous resins sold under the trademarks, Surlyn® (DuPont) and Escor® and Iotek® (Exxon). These ionomer resins are available in various grades and are identified based on the type of base resin, molecular weight, type of metal ion, amount of acid, degree of neutralization, additives, and other properties.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from Exxon Mobil Chemical Company. Some suitable examples of highly neutralized ionomers (HNP) are DuPont® HPF 1000 and DuPont® HPF 2000, ionomeric materials commercially available from E. I. du Pont de Nemours and Company. In some embodiments, very low modulus ionomer- ("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

Any or each of core layers, intermediate/casing layers, and cover layers may be formed from ionomeric materials including blends of ionomers such as blends of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, may comprise for example ionomeric copolymers and terpolymers, ionomer precursors, thermoplastics, polyamides, polycarbonates, polyesters, polyurethanes, polyureas, polyurethane/urea hybrids, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

Additional suitable materials for golf ball layers include polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, e.g., (meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether block amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof.

Thus, in one embodiment, the cover is a single layer formed from a composition selected from the group consisting of ionomers, polyester elastomers, polyamide elastomers, and combinations of two or more thereof. In a second embodiment, the cover may comprise a composition formed from a thermoplastic polyurethane, thermoset polyurethane, thermoplastic polyurea, or thermoset polyurea. In another version, the cover layer comprises a blend of from about 10% to about 90% by weight of the polyurea composition and from about 90% to about 10% of a polyurethane composition. In yet another embodiment, the cover layer comprises a blend of from about 10% to about 90% by weight of the polyurea composition and from about 90% to about 10% of another polymer or other material such as vinyl resins, polyesters, polyamides, and polyolefins.

When used as cover layer materials, polyurethanes, polyureas, and urea-urethane hybrids can be thermoset or thermoplastic. Thermoset materials can be formed into golf ball layers by conventional casting or reaction injection molding techniques. Thermoplastic materials can be formed into golf ball layers by conventional compression or injection molding techniques. Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Polyurethane cover compositions that can be used include those formed from the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, that is, as part of a prepolymer and in the curing agent. The curing agent includes a polyol curing agent preferably selected from the group consisting of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl)ether; trimethylol propane; and combinations thereof.

Suitable polyurethane cover compositions also include those formed from the reaction product of at least one isocyanate and at least one curing agent or the reaction product of at least one isocyanate, at least one polyol, and at least one curing agent. Preferred isocyanates include those selected from the group consisting of 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, and combinations thereof. Preferred polyols include those selected from the group consisting of polyether polyol, hydroxy-terminated polybutadiene, polyester polyol, polycaprolactone polyol, polycarbonate polyol, and combinations thereof. Preferred curing agents include polyamine curing agents, polyol curing agents, and combinations thereof. Polyamine curing agents are particularly preferred. Preferred polyamine curing agents include, for example, 3,5-dimethylthio-(2,4 or 2,6)-toluenediamine, or an isomer thereof; 3,5-diethyltoluene-(2,4 or 2,6)-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and combinations thereof.

The cover composition is not limited by the use of a particular polyisocyanate. Suitable polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H$_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); trans-cyclohexane diisocyanate (CHDI); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. Polyisocyanates are known to those of ordinary skill in the art as having more than one isocyanate group, e.g., di-, tri-, and tetra-isocyanate. Preferably, the polyisocyanate is selected from MDI, PPDI, TDI, and combinations thereof. More preferably, the polyisocyanate includes MDI. It should be understood that, as used herein, the term "MDI" includes 4,4'-diphenylmethane diisocyanate, polymeric MDI, carbodiimide-modified liquid MDI, combinations thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate may have less than 14% unreacted NCO groups. Preferably, the at least one polyisocyanate has no greater than 8.5% NCO, more preferably from 2.5% to 8.0%, or from 4.0% to 7.2%, or from 5.0% to 6.5%.

The cover composition is not limited by the use of a particular polyol. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Particularly preferred are polytetramethylene ether glycol ("PTMEG"), polyethylene propylene glycol, polyoxypropylene glycol, and combinations thereof. The hydrocarbon chain can have saturated or unsaturated bonds and substituted or unsubstituted aromatic and cyclic groups. Preferably, the polyol includes PTMEG. Suitable polyester polyols include, but are not limited to, polyethylene adipate glycol, polybutylene adipate glycol, polyethylene propylene adipate glycol, ortho-phthalate-1,6-hexanediol, and combinations thereof. The hydrocarbon chain can have saturated or unsaturated bonds, or substituted or unsubstituted aromatic and cyclic groups. Suitable polycaprolactone polyols include, but are not limited to 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and combinations thereof. The hydrocarbon chain can have saturated or unsaturated bonds, or substituted or unsubstituted aromatic and cyclic groups. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of polyurethane compositions and have been found to improve cut, shear, and impact resistance of the resultant balls. Preferred polyamine curatives include, but are not limited to 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylene-diamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and combinations thereof. Preferably, the curing agent includes 3,5-dimethylthio-2,4-toluenediamine and isomers thereof, such as ETHACURE 300. Suitable polyamine curatives, which include both primary and secondary amines, preferably have weight average molecular weights ranging from about 64 to about 2000.

At least one of a diol, triol, tetraol, or hydroxy-terminated curative may be added to the polyurethane composition. Suitable diol, triol, and tetraol groups include ethylene glycol; diethylene glycol; polyethylene glycol; propylene glycol; polypropylene glycol; lower molecular weight poly-tetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(4-hydroxyethyl)ether; hydroquinone-di-(4-hydroxyethyl) ether; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,3-bis-[2-(2-hydroxyethoxy) ethoxy]cyclohexane; 2,2'-(1,4-phenylenedioxy)diethanol, 1,3-bis-{2-[2-(2-hydroxyethoxy) ethoxy]ethoxy}cyclohexane; trimethylolpropane; and combinations thereof. Preferred hydroxy-terminated curatives include ethylene glycol; diethylene glycol; 1,4-butanediol; 1,5-pentanediol; 1,6-hexanediol, trimethylol propane, and combinations thereof. Preferably, the hydroxy-terminated curative has a molecular weights ranging from about 48 to 3900. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a pre-polymer method. In this method, the polyisocyanate and the polyol are mixed separately prior to addition of the curing agent. This method affords a more homogeneous mixture resulting in a more consistent polymer composition.

In the casting process, polyurethane, polyurea and/or polyurea/urethane compositions can be formed by chain-extending the a prepolymer with a single curing agent or blend of curing agents as described further below. The compositions of the present invention may be selected from among both thermoplastic and thermoset materials. In general, thermoplastic polyurethane compositions are typically formed by reacting the isocyanate blend and polyols at a 1:1 stoichiometric ratio. Similarly, thermoplastic polyurea compositions are typically formed by reacting the isocyanate blend and polyamines at a 1:1 stoichiometric ratio. Thermoset polyurethane compositions, on the other hand, are cross-linked polymers and are typically produced from the reaction of the isocyanate blend and polyols at normally a 1.05:1 stoichiometric ratio. Similarly, thermoset polyureas are typically produced from the reaction of the isocyanate blend and polyamines at normally a 1.05:1 stoichiometric ratio.

When the polyurethane prepolymer is reacted with hydroxyl-terminated curing agents during the chain-extending step, the resulting composition is essentially a pure polyurethane composition containing urethane linkages having the following general structure:

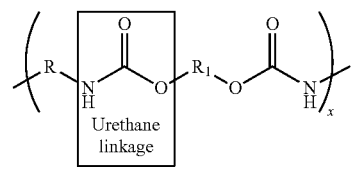

where x is the chain length, i.e., about 1 or greater, and R and $R_1$ are straight chain or branched hydrocarbon chain having about 1 to about 20 carbons.

And when When the polyurea prepolymer is reacted with amine-terminated curing agents during the chain-extending step, as described above, the resulting composition is essentially a pure polyurea composition.

However, a polyurethane/urea hybrid will result when a polyurethane prepolymer is reacted with an amine-terminated curing agent during the chain-extending step, any excess isocyanate groups in the prepolymer will react with the amine groups in the curing agent and create urea linkages having the following general structure:

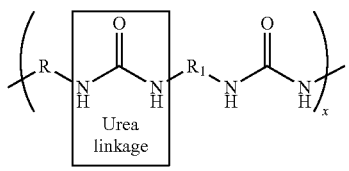

where x is the chain length, i.e., about 1 or greater, and R and $R_1$ are straight chain or branched hydrocarbon chain having about 1 to about 20 carbons.

Meanwhile, a polyurea-urethane hybrid will form when a polyurea prepolymer is reacted with a hydroxyl-terminated curing agent during the chain-extending step, any excess isocyanate groups in the prepolymer will react with the hydroxyl groups in the curing agent and create urethane linkages.

Catalysts may be employed to promote the reaction when producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

Suitable polyurethanes are further disclosed, for example, in U.S. Pat. Nos. 5,334,673, 6,506,851, 6,756,436, 6,867,279, 6,960,630, and 7,105,623, the entire disclosures of which are hereby incorporated herein by reference. Suitable polyureas are further disclosed, for example, in U.S. Pat. Nos. 5,484,870 and 6,835,794, and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

When injection molding is used to form a golf ball layer, the layer composition is typically in a pelletized or granulated form that can be easily fed into the throat of an injection molding machine wherein it is melted and conveyed via a screw in a heated barrel at temperatures of from about 150° F. to about 600° F., preferably from about 200° F. to about 500° F. The molten composition is ultimately injected into a closed mold cavity, which may be cooled, at ambient or at an elevated temperature, but typically the mold is cooled to a temperature of from about 50° F. to about 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

Castable reactive liquid polyurethanes and polyurea materials may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions may also be used employing the same casting process.

For example, once a polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, or within a range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the shell through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting polyurea prepolymer and curing agent introduced therein to commence gelling.

Similarly, U.S. Pat. Nos. 5,006,297 and 5,334,673 both also disclose suitable molding techniques that may be utilized to apply the castable reactive liquids employed in the present invention.

However, it is envisioned that layers of golf balls of the invention may be made by any known technique to those skilled in the art.

Cover compositions may also include one or more filler(s), such as coloring agents, fluorescent agents, whitening agents, antioxidants, dispersants, UV absorbers, light stabilizers, plasticizers, surfactants, compatibility agents, foaming agents, reinforcing agents, release agents, and the like.

Several suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

The golf ball of this invention may have single-, dual-, or multi-layered covers preferably having an overall thickness within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In one embodiment, the cover is a single layer having a thickness of from 0.025 inches to 0.035 inches. Again, the cover hardness may be targeted depending on desired playing characteristics. As a general rule, all other things being equal, a golf ball having a relatively soft cover will spin more than a similarly constructed ball having a harder cover.

It is envisioned that golf balls of the invention may also incorporate conventional coating layer(s) for the purposes usually incorporated. For example, one or more coating layer may have a combined thickness of from about 0.1 μm to about 100 μm, or from about 2 μm to about 50 μm, or from about 2 μm to about 30 μm. Meanwhile, each coating layer may have a thickness of from about 0.1 μm to about 50 μm, or from about 0.1 μm to about 25 μm, or from about 0.1 μm to about 14 μm, or from about 2 μm to about 9 μm, for example.

In one embodiment, the subassembly is a single-piece core having an outside diameter of about 1.20 to about 1.65 inches. Preferably, the single-piece core has a diameter of about 1.62 inches. The core generally makes up a substantial portion of the ball, for example, the core may constitute at least about 90% of the ball. The hardness of the core may vary depending upon the desired properties of the ball.

One non-limiting example of such a construction is as follows. The core may be a single-piece polybutadiene core having a diameter of at least about 1.58 inches; and a polyurethane cover may have a thickness of less than about 0.070 inches.

In another embodiment, the core may include a spherical inner core portion and surrounding outer core layer. In this dual or two-piece core, often referred to as the "center" of the ball, the inner core portion may have a diameter of about 0.5 to about 1.30 inches, more preferably 1.00 to 1.15 inches, and be relatively soft (that is, it may have a compression of less than the outer core layer). The outer core layer may have a thickness of about 0.20 to about 0.60 inches and be relatively hard. That is, the two-piece core or "center" of the ball, which constitutes the inner core and outer core layer, may have a total diameter of about 1.50 to about 1.64 inches, more preferably 1.510 to 1.620 inches, and a compression of about 80 to about 115, more preferably 85 to 110.

In one instance, the core is a two-piece core having a total diameter of about 1.40 inches to about 1.62 inches and comprising an inner core portion having a diameter of about 0.90 inches to about 1.20 inches, and an outer core portion having a thickness of about 0.21 to about 0.36 inches. In such a construction, the cover preferably has a thickness of less than 0.070 inches, preferably less than about 0.040 inches. More preferably, the cover has a thickness of about 0.015 to 0.040 inches.

The following are additional examples of golf ball constructions. In a first example, a golf ball of the invention may include a single or multi-layered rubber-based core having a diameter of about 1.58", which is surrounded and encased by a layer of polycycopentene rubber. A polyurethane cover may be formed about the layer of polycycopentene rubber to complete the golf ball. The cover in this embodiment has a thickness of 0.045 inches. Embodiments are also envisioned wherein a core layer and/or the cover may comprise the polycyclopentene rubber.

It is envisioned that in each of the aforementioned examples, the polycyclo pentene rubber-containing layer may consist entirely of the polycyclo pentene rubber or may comprise a blend of the polycyclo pentene rubber and at least one thermoset or thermoplastic polymer or composition and/or other property improving/altering co-agents, etc.

Advantageously, a single layer of polycyclopentene rubber possesses the adhesion properties and elongation necessary to produce a durable golf ball.

As used herein, "modulus" or "flexural modulus" refers to flexural modulus as measured using a standard flex bar according to ASTM D790-B.

As used herein, tensile strength refers to tensile strength as measured using ASTM D-638.

As used herein, elongation refers to ultimate elongation as measured using ASTM D-638.

In the present invention, "compression" is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton.

In a golf ball if the invention, Coefficient of Restitution or CoR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. CoR is then calculated as the ratio of the outgoing transit time period to the incoming transit time period, $CoR=V_{out}/V_{in}=T_{in}/T_{out}$. The CoR value can be targeted, for example, by varying the core peroxide and antioxidant types and amounts as well as the cure temperature and duration.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

Golf balls of the present invention preferably have a moment of inertia ("MOI") of 70-95 g·cm², preferably 75-93 g·cm², and more preferably 76-90 g·cm². For low MOI embodiments, the golf ball preferably has an MOI of 85 g·cm² or less, or 83 g·cm² or less. For high MOI embodiment, the golf ball preferably has an MOI of 86 g·cm² or greater, or 87 g·cm² or greater. MOI is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

Thermoset and thermoplastic layers herein may be treated in such a manner as to create a positive or negative hardness gradient. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

It is understood that the golf balls of the invention incorporating at least one layer of polycyclopentene rubber as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

It is also envisioned that a golf ball of the invention may include one or more very thin moisture barrier layers in order to protect golf ball layers that might be vulnerable to moisture penetration that could change targeted golf ball properties such as CoR. Such a moisture barrier layer may be monolayer, bi-layer and/or multi-layered, but has an overall thickness that does not change the targeted properties of the golf ball and is not therefore referred to herein as a "layer".

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball having an intermediate layer comprising a polycyclopentene rubber composition comprised of at least one polycyclopentene rubber, wherein each polycyclopentene rubber is a linear, unbranched chain polymer and disposed between a core layer that does not contain the at least one polycyclopentene rubber and at least one cover layer comprising a thermoset or thermoplastic material.

2. The golf ball of claim 1, wherein the core layer has a surface hardness of less than 82 Shore C and greater than a Shore C geometric center hardness of the core layer by from 15 to 30 Shore C hardness points to define a positive hardness gradient.

3. The golf ball of claim 1, wherein the intermediate layer has a surface hardness of at least 83 Shore C.

4. The golf ball of claim 1, wherein the at least one polycyclopentene rubber is crosslinked with at least one of a peroxide compound and a sulfur compound.

5. The golf ball of claim 4, wherein the peroxide and/or sulfur compound is present in an amount of from about 1 part to about 5 parts based on 100 parts of the at least one polycyclopentene rubber.

6. The golf ball of claim 3, wherein greater than 50 wt. % of the at least one polycyclopentene rubber is trans-polycyclopentene rubber.

7. The golf ball of claim 3, wherein greater than 50 wt. % of the at least one polycyclopentene rubber is cis-polycyclopentene rubber.

8. The golf ball of claim 3, wherein the cover layer consists of a thermoset polyurethane.

9. The golf ball of claim 3, wherein the cover layer consists of a thermoplastic polyurethane.

10. The golf ball of claim 1, wherein cyclopentene rings are opened and terminal ends of each cyclopentene rubber molecule are mono-substituted.

11. The golf ball of claim 1, wherein cyclopentene rings are opened and terminal ends of each cyclopentene rubber molecule are di-substituted.

12. The golf ball of claim 1, wherein cyclopentene rings are opened; wherein at least one cyclopentene rubber molecule has terminal ends that are mono-substituted; and wherein at least one other cyclopentene rubber molecule has terminal ends that are di-substituted.

13. The golf ball of claim 1, wherein cyclopentene rings are opened and at least one cyclopentene rubber molecule has an alpha terminal end that is the same as an omega terminal end of the cyclopentene rubber molecule.

14. The golf ball of claim 1, wherein cyclopentene rings are opened and at least one cyclopentene rubber molecule has an alpha terminal end that is different than an omega terminal end of the cyclopentene rubber molecule.

15. The golf ball of claim 1, wherein cyclopentene rings are opened and at least one of an alpha terminal end and an omega terminal end of a cyclopentene rubber molecule has a functional group selected from the group consisting of hydroxyl, amine, vinyl unsaturation, carboxylic acid and derivatives, acrylic, methacrylic, silane, siloxane, thiol, sulfonic acid, epoxy, ester, amide, urethane, urea, halogen, or hydrocarbon, or combinations thereof.

16. The golf ball of claim 1, wherein cyclopentene rings are opened and each cyclopentene rubber molecule becomes mono-substituted or di-substituted at terminal ends using a chain transfer agent consisting of olefinically unsaturated hydrocarbons having a selected functional group at the terminal ends of the olefin portion of the olefinically unsaturated hydrocarbon.

17. A golf ball comprising:
a core having a diameter of 1.55 inches or less and comprised of polybutadiene;
an intermediate layer having an outer diameter of no greater than 1.62 inches and comprising a mixture of: (i) 100 parts of cis-linear, unbranched polycyclopentene rubber, (ii) dicumyl peroxide in an amount of about 1 to 5 parts per 100 parts of cis-linear, unbranched polycyclopentene rubber, and (iii) at least one co-agent selected from the group consisting of zinc diacrylate, zinc dimethacrylate, trimethylolpropane triacrylate and trimethylolpropane trimethacrylate in an amount of about 25 parts per 100 parts of cis-linear, unbranched polycyclopentene rubber; and
a cover layer disposed about the intermediate layer comprising a thermoset or thermoplastic composition.

* * * * *